(12) United States Patent
Gerber et al.

(10) Patent No.: US 6,914,518 B1
(45) Date of Patent: Jul. 5, 2005

(54) INTERROGATION AND RESPONDER SYSTEM FOR IDENTIFYING A TARGET

(75) Inventors: Peter Gerber, Berikon (CH); Fabian Ochsner, Nussbaumen (CH)

(73) Assignee: RUAG Electronics, Bern (CH)

( * ) Notice: Subject to any disclaimer, the term of this patent is extended or adjusted under 35 U.S.C. 154(b) by 173 days.

(21) Appl. No.: 09/592,179

(22) Filed: Jun. 12, 2000

(30) Foreign Application Priority Data

May 12, 2000 (CH) .............................................. 0943/00

(51) Int. Cl.[7] .......................... H04Q 5/22; G01S 13/78
(52) U.S. Cl. ..................... 340/10.4; 340/10.41; 342/45
(58) Field of Search ............................ 340/10.4, 10.41, 340/10.42, 825.57, 10.1, 10.3, 10.31, 10.2; 934/22, 11, 19, 21; 342/42–45, 50, 54, 51; 359/155, 152, 154, 159

(56) References Cited

U.S. PATENT DOCUMENTS 5,001,488 A 3/1991 Joguet

FOREIGN PATENT DOCUMENTS

| DE | 2 146 498 | 3/1973 |
|----|-----------|--------|
| EP | 0 836 068 A1 | 4/1998 |
| EP | 0 836 069 A | 4/1998 |
| EP | 0 859 243 A1 | 8/1998 |
| FR | 2 681 143 | 3/1993 |
| WO | 99/49333 | 9/1999 |

OTHER PUBLICATIONS

U. S. Appl. No. 09/592,179, filed Jun. 12, 2000, Gerber et al.

*Primary Examiner*—Michael Horabik
*Assistant Examiner*—Nam Nguyen
(74) *Attorney, Agent, or Firm*—Townsend and Townsend and Crew LLP; Guy W. Chambers

(57) ABSTRACT

The interrogation device is used for identifying a target device. A transmitter is designed for transmitting a coded electromagnetic radiation. The target device has sensor means for detecting this radiation and for converting it into electrical signals, which are supplied to an evaluation unit, as well as transmitting means which, in accordance with decisions made by the evaluation unit, return messages to receiving means located inside or outside of the transmitter. The transmitter comprises a circuit with an oscillator and an antenna, which are designed to generate individual pulses, or short bursts of pulses in the giga-frequency range, which are chronologically modulated. A coded information signal is obtained from these pulses.

9 Claims, 1 Drawing Sheet

INTERROGATION AND RESPONDER SYSTEM FOR IDENTIFYING A TARGET

FIELD OF THE INVENTION

The invention relates to an interrogation and responder system.

BACKGROUND OF THE INVENTION

A laser identification/simulation system with a laser device for identifying a responder device is known from European Patent Application 97 120818.6 (Publication No. EP 0 859 243 A1). The laser device is designed for transmitting a coded laser beam, wherein the responder device has sensor means for detecting the laser beam and for converting it into electrical signals, which are passed on to an evaluation unit, as well as transmitting means for returning messages in accordance with decisions made in the evaluation unit to receiving means located inside or outside of the interrogation system. This interrogation system is designed to send a tight directional laser beam and contains chopping means for sending out a laser beam which is not only coded, but also chopped with a predetermined frequency. The sensor means of the responder device include means for obtaining an electrical signal from the received chopped laser beam, which is supplied to a pre-amplifier, which is connected upstream of the discriminator.

Such a system is mounted in weapons which are normally used by soldiers, wherein all participants in an exercise, both persons and objects, can be equipped with detectors, which register a possible weapons effect on the participant. The functioning of such known systems represents the basis of a friend-foe identification system (IFF), which can also be used in accordance with the present invention.

OBJECT AND SUMMARY OF THE INVENTION

It is now the object of the present invention to create a further system of this type, which avoids or reduces the disadvantages of known systems.

In accordance with the invention, an interrogation device is used for identifying a target device. A transmitter is designed for transmitting a coded electromagnetic radiation. The target device has sensor means for detecting this radiation and for converting it into electrical signals, which are supplied to an evaluation unit, as well as transmitting means which, in accordance with decisions made by the evaluation unit, return messages to receiving means located inside or outside of the transmitter. The transmitter comprises a circuit with an oscillator and an antenna, which are designed to generate individual pulses, or short bursts in the giga-frequency range, which are chronologically modulated. A coded information signal is obtained from these pulses.

Further advantageous embodiments of the invention ensue from the further dependent claims.

The invention will be explained in greater detail in what follows by means of different drawings.

DETAILED DESCRIPTION OF THE PREFERRED EMBODIMENTS

Figure 1:
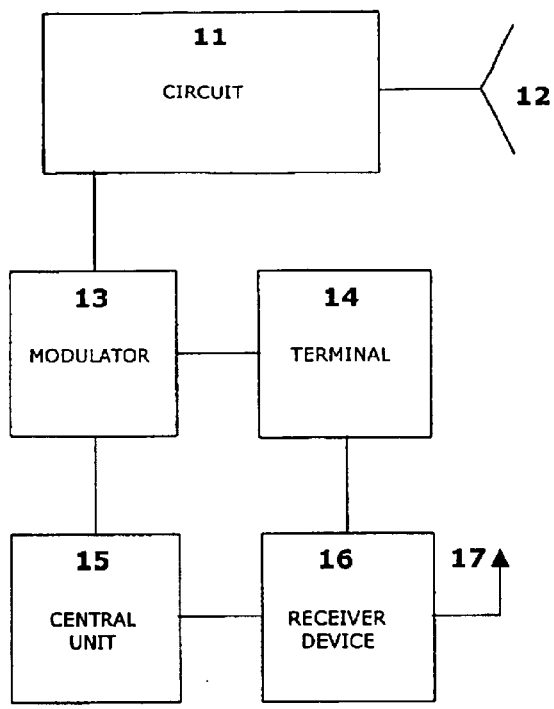
FIG. 1 shows a schematic representation of a transmitting device (interrogation system) in accordance with the invention.

The interrogation system 10 in accordance with FIG. 1 comprises a circuit 11, which can be mounted on a weapon and which has an antenna 12, which can be integrated into the circuit 11, and a modulator 13, to which at least one terminal 14, as well as a central unit 15 can be connected. The terminal 14 is, for example, provided with a keyboard and/or a display and/or a microphone and/or a headset, etc. The circuit 11, which is designed as an active transmitter, can generate single pulses or short bursts of pulses (for example by means of an oscillator), which are very short but nevertheless have relatively large energy. Receiving means 16, 17 are connected to the central unit 15 of the interrogation system 10, which are located inside or outside of the actual interrogation system 10. The receiving means 16, 17, which can also be connected to one of the mentioned terminals 14 and/or also to other terminals, comprise a receiver device 16 and an antenna or a sensor 17, for example. In place of the structure represented in FIG. 1, the interrogation system 10 can have a communications bus, for example.

Figure 2:
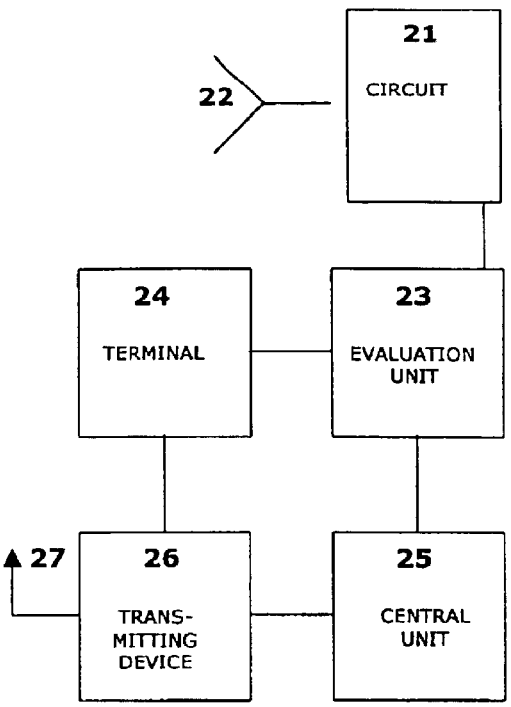
FIG. 2 shows a schematic representation of a receiving device (responder device) in accordance with the invention.

The responder system 20 in accordance with FIG. 2 comprises a receiver circuit 21 with a receiver antenna 22, which can be integrated into the circuit 21. The responder system 20 can contain a demodulator or evaluation unit 23, for example, for evaluating the received electromagnetic waves, to which at least one terminal 24 and a central unit terminal 25 are connected. The terminal 24 can be provided, for example, with a display and/or a headset and/or a microphone. The circuit 21, which is designed as a receiver, can for example comprise a detector and, if required, an amplifier, which process pulses or bursts of pulses received by the antenna 22. Transmitting means 26, 27 are connected to the central unit 25 for returning messages in accordance with decisions made in the evaluation unit to receiving means 16, 17 (FIG. 1) of the interrogation system. The transmitting means 26, 27, which can also be located inside or outside of the actual responder system 20, for example comprise a transmitting device 26 and a transmitting antenna 27.

The system in accordance with the invention now functions as follows:

The persons and objects (tanks, etc.) participating in an exercise can carry at least one receiver 21, 22, preferably with the aid of a harness system in accordance with European Patent Applications EP 0 859 243 A1 and/or EP 0 836 068 A1 and/or EP 0 836 069 A1. Incidentally, the subject of the present invention can comprise all means mentioned in the above patent applications for carrying out all functions known from these patent applications in the same or similar manner.

Figure 3:
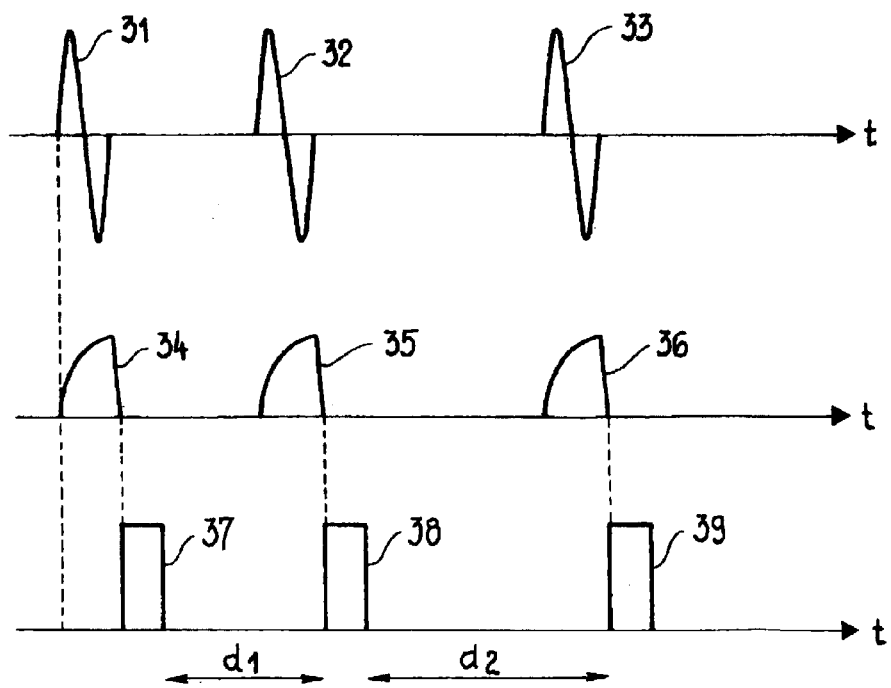
FIG. 3 represents a diagram for explaining the information signals used.

Three pulses 31, 32, 33 on the order of picoseconds are represented in FIG. 3 by way of example. This corresponds to an oscillation frequency of 10 to 1000 GHz and a wave length of 30 to 0.3 mm. Since, because of this, the required antenna 12 need only have relatively small dimensions, it can be designed in such a way that it can be mounted on the weapon. Moreover, if desired, the antenna 12, together with an oscillator, can be integrated in the circuit 11. Signals delivered from a terminal 14 cause a modulation and/or a coding in the modulator 13 of the control signals for the oscillator in such a way, that the pulses 31, 32, 33 are triggered at different intervals. Thus, these pulses contain the information to be transmitted. With an appropriate shaping of the antenna 12 it is possible to transmit the pulses 31, 32, 33 in a directed, or respectively directional manner. The manner of transmission employed here is also known as ultra-wide spread spectrum transmission. It has been found that this type of transmission has various properties, which make the advantageous realization of the systems in accordance with the invention possible. Such systems can be constructed to be small and energy-saving. With this type of communications it is also possible to determine the distance to the target (responder device). A further important advantage is that the communications principle employed here is difficult to detect for third parties.

The radiation characteristics of the interrogation system 10 can be directed as desired by means of a suitable antenna 12. With an appropriate antenna 12 it is possible to achieve an angle of the radiated lobe of up to 30 mrad. The layout and the dimensioning of antennas is sufficiently known to one skilled in the art.

The pulses 31, 32, 33 received via the antenna 22 in the receiver circuit 21 are detected and preferably also amplified. It is then possible to generate from the detected pulses 34, 35, 36 information pulses 37, 38, 39 (for example in rectangular form), which can easily be much longer than the pulses 31, 32, 33, and can also be chronologically displaced. Information provided in coded form by means of the different spacing d1, d2 between the individual pulses 37, 38, 39 is deciphered in the demodulator 23 and is provided in a suitable electrical form to at least one of the terminals 24, 25. The responder system 20 can be designed, for example, for radiating response signals and/or echo signals via the transmitting means 26, 27, which can be received by the receiving means 16, 17 of the interrogation system 10. A distance measurement between the interrogation system 10 and the responder system 20 is made possible by this. This means that the marksman performing the interrogation can even measure the distance to his target (the responder system 20). This has the advantage that, in case two objects located behind each other are illuminated, the soldier has the additional possibility of estimating which signal is more realistic.

In place of individual pulses 31, 32, 33 it is also possible to transmit bursts of pulses which, if necessary, are damped and/or harmonic and/or inharmonic, for the purpose of interrogation.

What is claimed is:

1. An interrogation system for use with a hand-held weapon comprising:

a hand-held weapon, a transmitting device attached to said hand-held weapon which transmits an inquiry to a responder device in the form of directionally specific single electromagnetic pulses or short bursts of electromagnetic pulses which are staggered with different distances between said pulses or short bursts of pulses in order to transmit coded information, a responder device having a sensor for detecting such electromagnetic pulses, an evaluation unit for processing such detected pulses and a transmitter for sending back a response to the transmitting device's inquiry, wherein said transmitting device further contains a transmitting device sensor for detecting a response from said responder device.

2. The interrogation system in accordance with claim 1, wherein said transmitting device has a control circuit and an antenna for transmitting its inquiry signals.

3. The interrogation system in accordance with claim 2, wherein the antenna is integrated into said control circuit.

4. The interrogation system in accordance with claim 1, wherein said directional specificity is achieved with an angle of a radiated lobe below 50 mrad.

5. The interrogation system in accordance with claim 4, wherein said responder generates staggered information pulses with different distances between said pulses corresponding to said staggered transmitting device pulses.

6. The interrogation system in accordance with claim 1, wherein said transmitting device can perform a distance measurement using the response signal received from said responder device.

7. The interrogation system in accordance with claim 1, wherein the sensor of the responder device is designed to be received in a portable harness system.

8. The interrogation system in accordance with claim 1, wherein at least a part thereof can be integrated into a weapon.

9. The interrogation system in accordance with claim 1 wherein said responder device includes an antenna for receiving said electromagnetic pulses from said transmitting device.

* * * * *